No. 818,734. PATENTED APR. 24, 1906.
E. BLIN.
BALL BEARING.
APPLICATION FILED OCT. 22, 1904.

Witnesses: Inventor
Eugène Blin,
Attorney

UNITED STATES PATENT OFFICE.

EUGÈNE BLIN, OF AUBERVILLIERS, FRANCE, ASSIGNOR TO LA SOCIÉTÉ DES ÉTABLISSEMENTS MALICET ET BLIN, OF AUBERVILLIERS, FRANCE.

BALL-BEARING.

No. 818,734.  Specification of Letters Patent.  Patented April 24, 1906.

Application filed October 22, 1904. Serial No. 229,619.

*To all whom it may concern:*

Be it known that I, EUGÈNE BLIN, a citizen of the Republic of France, residing at Aubervilliers, France, have invented certain new and useful Improvements in Ball-Bearings, of which the following is a specification.

This invention relates to a construction of ball-bearings whereby the balls may be introduced into and taken out of annular ball-bearings—that is to say, ball-bearings constituted by two concentric rings, each provided with a groove or track between which the balls roll, no auxiliary means being necessary to retain the balls in place.

Figure 1:
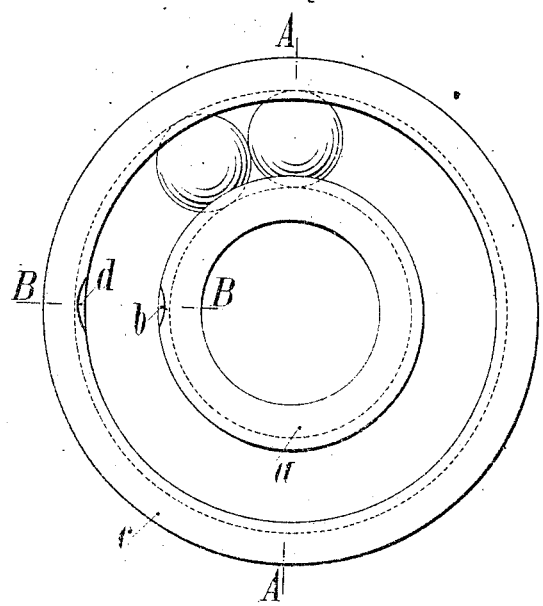
Figure 2:
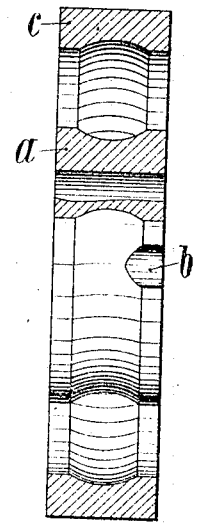
Figure 3:
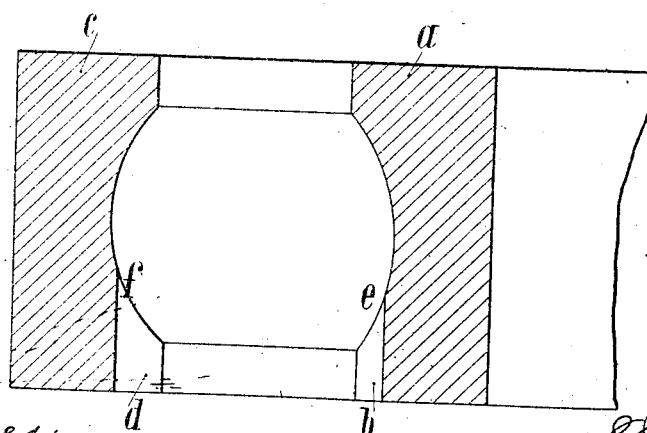

In the accompanying drawings, Figure 1 shows a ball-bearing constructed according to this invention in front elevation. Fig. 2 is a section on the line A A of Fig. 1. Fig. 3 is an enlarged section on the line B B of Fig. 1.

According to this invention, the outer portion of the inner ring $a$ is provided with a notch or cut-away part $b$, which starts from one of the sides of the ring and being of less depth than the groove containing the balls does not therefore extend to the bottom of that groove. In the same way on the inside of the outer ring $c$ is made another notch or recess $d$, so that when the two rings are placed concentrically with their two notches facing each other the distance separating the two walls $e f$ of the notches is smaller than the distance between the two track-surfaces on which the balls roll.

When a sufficient number of balls has been introduced into the bearing in order to keep the two rings concentric, a ball is introduced between the two notches when they face each other, Fig. 1, but it cannot enter the ball track unless forced in. However, owing to the elasticity of the material the ball can be driven in, where it remains. All the remaining balls will be introduced in the same manner. Thus the two rings by themselves constitute a complete ball-bearing and ball-retaining device without the use of auxiliary parts.

In order to remove a ball, the two notches $b d$ are brought opposite each other, and the ball opposite the said notches is forced out from the other side between the two notches. The other balls can be removed in the same way until a sufficient number are removed to allow the bearing to fall apart. The result of this arrangement is that it is not necessary to close the notches in order to prevent the balls from escaping. It will, moreover, be understood that in this construction the traveling path of the balls does not present any lack of continuity due to joints between various parts.

What I claim as my invention, and desire to secure by Letters Patent, is—

A two-part ball-bearing and ball-retaining device comprising two annular concentric rings, ball-track grooves on the outer circumference of the inner ring and on the inner circumference of the outer ring, and notches $b d$ in the edges of said rings of such depth that when the balls are inserted and spring into the ball-race the opening formed by the notches is slightly less than the diameter of the balls, which cannot therefore escape, substantially as set forth.

In testimony whereof I have signed my name to this specification in the presence of two subscribing witnesses.

EUGÈNE BLIN.

Witnesses:
JOHN BAKER,
GEORGES BONNEUT.